United States Patent
Stobbe et al.

(10) Patent No.: US 12,049,307 B2
(45) Date of Patent: Jul. 30, 2024

(54) VTOL AIRCRAFT WITH ELECTRIC PROPULSION

(71) Applicant: Volocopter GmbH, Bruchsal (DE)

(72) Inventors: Martin Stobbe, Inning (DE); Krishna Pal Rajput, Munich (DE); Sebastian Mores, Munich (DE)

(73) Assignee: Volocopter GmbH, Bruchsal (DE)

( * ) Notice: Subject to any disclaimer, the term of this patent is extended or adjusted under 35 U.S.C. 154(b) by 0 days.

(21) Appl. No.: 17/591,811

(22) Filed: Feb. 3, 2022

(65) Prior Publication Data

US 2022/0281593 A1 Sep. 8, 2022

(30) Foreign Application Priority Data

Mar. 8, 2021 (EP) .................................. 21161173

(51) Int. Cl.
| | |
|---|---|
| *B64C 29/00* | (2006.01) |
| *B64C 3/16* | (2006.01) |
| *B64C 3/32* | (2006.01) |
| *B64C 39/06* | (2006.01) |
| *B64D 27/24* | (2024.01) |

(52) U.S. Cl.
CPC ............ *B64C 29/0025* (2013.01); *B64C 3/16* (2013.01); *B64C 3/32* (2013.01); *B64C 39/068* (2013.01); *B64D 27/24* (2013.01)

(58) Field of Classification Search
CPC ......... B64C 29/0025; B64C 3/16; B64C 3/32; B64C 39/068; B64D 27/24
See application file for complete search history.

(56) References Cited

U.S. PATENT DOCUMENTS

| | | |
|---|---|---|
| 3,834,654 A | 9/1974 | Miranda |
| D311,720 S | 10/1990 | Butler |
| (Continued) | | |

FOREIGN PATENT DOCUMENTS

| | | | |
|---|---|---|---|
| DE | 19947633 A1 * | 9/2000 | ............... B64C 3/16 |
| EP | 3757004 | 12/2020 | |
| (Continued) | | | |

OTHER PUBLICATIONS

Machine Translation of DE-19947633-A1, Lebelt A, Sep. 2000 (Year: 2000).*

(Continued)

*Primary Examiner* — Tien Q Dinh
*Assistant Examiner* — Katherine June Bolek
(74) *Attorney, Agent, or Firm* — FIG. 1 Patents

(57) ABSTRACT

A VTOL aircraft (1) having a fuselage (2) for transporting passengers and/or load, front and rear wings (3, 4) attached to the fuselage, a right connecting beam (5a) and a left connecting beam (5b), which connecting beams structurally connect the front wing and the rear wing, and which connecting beams are spaced apart from the fuselage, and at least two lifting units (M1-M6) on each one of the connecting beams. The lifting units each include at least one propeller (6b) and at least one motor (6a) driving the propeller, preferably an electric motor, and are arranged with their respective propeller axis in an essentially vertical orientation. The front wing, at least in portions thereof, has a sweep angle γ between γ=45° and γ=135°, and the rear wing, at least in portions thereof, has a forward sweep with sweep angle β≥30°.

19 Claims, 4 Drawing Sheets

(56) References Cited

U.S. PATENT DOCUMENTS

| | | |
|---|---|---|
| 9,499,266 B1 | 11/2016 | Garreau |
| 10,081,436 B1 | 9/2018 | Tian |
| 10,577,091 B2 * | 3/2020 | Parks ................... B64C 27/30 |
| 2006/0151666 A1 * | 7/2006 | VanderMey ........ B64C 29/0016 244/12.3 |
| 2015/0048215 A1 * | 2/2015 | McGinnis ............. B64C 23/069 244/90 R |
| 2018/0105268 A1 | 4/2018 | Tighe et al. |
| 2018/0273170 A1 * | 9/2018 | D'Sa ..................... B64C 39/024 |
| 2018/0305005 A1 | 10/2018 | Parks et al. |
| 2020/0269980 A1 * | 8/2020 | Fink ...................... B64C 39/068 |
| 2020/0290725 A1 | 9/2020 | Jarrett et al. |
| 2020/0324871 A1 * | 10/2020 | Edwards ................... B64C 3/16 |
| 2020/0407055 A1 | 12/2020 | Mores et al. |
| 2020/0407060 A1 * | 12/2020 | Hosseini ................ B64D 27/02 |
| 2021/0031909 A1 | 2/2021 | Pachidis et al. |

FOREIGN PATENT DOCUMENTS

| | | | |
|---|---|---|---|
| EP | 3702276 | 1/2021 | |
| WO | WO-2020040671 A1 * | 2/2020 | ........... B64C 39/066 |
| WO | WO-2021009516 A1 * | 1/2021 | ............. B64C 27/08 |

OTHER PUBLICATIONS

"Flight Testing and Response Characteristics of a Variable Gull-Wing Morphing Aircraft", AIAA Guidance, Navigation, and Control Conference and Exhibit, Aug. 2004 (Year: 2004).*

"Parameterized Automated Generic Model for Aircraft Wing Structural Design and Mesh Generation for Finite Element Analysis", Linköping Studies in Science and Technology, Sep. 2011 (Year: 2011).*

\* cited by examiner

VTOL AIRCRAFT WITH ELECTRIC PROPULSION

INCORPORATION BY REFERENCE

The following documents are incorporated herein by reference as if fully set forth: European Patent Application No. 21 161 173.6, filed Mar. 8, 2021.

TECHNICAL FIELD

The invention relates to a vertical take-off and landing (VTOL) aircraft, and in particular with electrically powered propulsion or lifting units, i.e., a so-called eVTOL aircraft.

BACKGROUND

Somewhat similar aircraft designs are disclosed, e.g., in U.S. D311720S, U.S. Pat. Nos. 3,834,654A, and 9,499,266B1.

Generally, contemporary eVTOL aircraft designs suffer from poor aerodynamic efficiency since they incorporate several systems in order to vertically lift the aircraft as well as to move it horizontally. In particular, none of the known designs can be regarded as naturally stable aircrafts. Examples for known designs comprise aircrafts by Zee Aero/Cora, cf. US2018/105268A1; EmbraerX; Aurora FlightScience (now part of Boeing); CityAirbus & Project Zero; AutoflightX, cf. U.S. Pat. No. 10,081,436B1.

The Pipistrel Nuuva V300 is an unmanned cargodrone, the main weight of which is centrally located, meaning that the wing surface distribution is essentially symmetrical about the y-z plane. It has a tandem wing and eight lifting propellers. A drawback is that the landing loads (similar to the Boeing/Aurora PAV) are transferred over the engine nacelles which is unfavourable.

None of the known designs achieves a comfortable passenger entry into the fuselage. All known designs lead to an unfavourable solution for passengers entering the aircraft. This is mainly due to the low vertical position of the propulsion and lifting system.

Most known designs have high aerodynamical blockages (or installation losses) of aircraft parts within the lifting propeller airflow during hover/low-speed conditions (cf. UBER elevate crm003), which leads to high power losses during hover and transition flight.

Most known designs have lifting propellers aft of each other. The greater the number, the higher the aerodynamic losses will be for the rear lying propellers, which leads to (an unnecessarily) high power consumption and thus increased overall aircraft weight or reduced travel range.

Most known designs are not scalable in size and are already greater than 10 m in span with a relatively low amount of payload. Hence scaling up to higher payloads and/or passenger capacity will result in even bigger aircraft sizes. However, landing sites are limited in size, especially in urban areas, and with increasing size, weight will increase over-proportionally.

Most known configurations have many, low diameter lifting propellers which have therefore a higher disk load which leads to an increased noise level.

The known designs lack a structurally integrated aircraft architecture that leads to high weight penalties or an aircraft with a low payload empty weight ratio.

In a previous application (EP 3 757 004 A1), applicant proposed a VTOL aircraft design that overcomes most, if not all of the above-mentioned disadvantages.

However, in order to provide reliable everyday VTOL aircraft, there is additional need for an improved hybrid-type or transition aircraft (i.e., a multicopter+a winged aircraft) in order to

- increase aerodynamic efficiency and/or minimize drag, in particular to be aerodynamically efficient in terms of lift to drag ratio when using a multicopter tandem wing;
- be aerodynamically naturally stable as an aircraft, hence creating an overall aircraft momentum to stabilize the aircraft in its longitudinal axis. This is essential to fulfil certification requirements more easily and to improve the aircraft's overall flight efficiency;
- create an aircraft wing configuration which works equally well in multicopter and in airplane mode, taking into account that the acting forces and momenta of both rotating lift units (propellers) and static lift units (wings) vary strongly in each condition and may lead to unfavourable aeromechanical characteristics; and/or
- cope with at least one engine or propeller failure, which implies respecting a specific centre of gravity location versus a location of the centre of actuation.

SUMMARY

It is the object of the invention to propose a novel VTOL aircraft design which provides further improvements over the design described in EP 3 757 004 A1, thus achieving a VTOL aircraft with increased natural stability, increased aerodynamical efficiency, and equally good aeromechanical characteristics in multicopter as well as in airplane mode, that can cope with at least one engine or propeller failure (one-engine-inoperative—OEI).

This object is achieved by means of a VTOL aircraft having one or more of the features disclosed herein. Advantageous further developments of such an aircraft are defined below and in the claims.

According to the invention, a VTOL aircraft comprises: a fuselage for transporting passengers and/or load; a front wing attached to the fuselage; a rear wing attached to the fuselage, behind the front wing in a direction of forward flight; a right connecting beam and a left connecting beam, which connecting beams structurally connect the front wing and the rear wing, which connecting beams are spaced apart from the fuselage; and at least two lifting units on each one of the connecting beams, which lifting units each comprise at least one propeller and at least one motor driving said propeller, preferably an electric motor, and are arranged with their respective propeller axis in an essentially vertical orientation; wherein the front wing, at least in portions thereof, has a sweep angle $\gamma$ between $\gamma=45°$ and $\gamma=135°$, preferably $\gamma=75°$, and the rear wing, at least in portions thereof, has a forward sweep (i.e., $\beta<90°$) with sweep angle $\beta \geq 30°$, preferably, $\beta=65°$.

A "swept wing" is a wing that angles either backward or forward from its root rather than in a straight sideways (90°) direction. The term "swept wing" is normally used to mean "swept back", but variants include forward sweep, variable sweep wings and oblique wings in which one side sweeps forward and the other back. In the present context, sweep angles<90° indicate a forward sweep, i.e., the wings angle forward in the direction of (forward) flight.

In the context of the invention, the sweep angle, $\gamma$, of the front wing can be comprised between $\gamma=45°$ and $\gamma=135°$. Preferably, $\gamma=75°$. The (forward) sweep angle, $\beta$, of the rear wing can be comprised between $\beta=30°$ and $\beta=90°$. Preferably, $\beta=65°$.

The connecting beams are preferably placed higher than (or above) the fuselage in a side view of the aircraft for better accessibility.

More generally, the present invention may comprise putting the following physically definable points (which are well known to a skilled person in the field of aviation) in a specific place in order to create a transition aircraft with good aeromechanical characteristics while having performant multicopter characteristics, especially in the case of one-engine-inoperative (OEI).

Said points are defined as follows, and this terminology will be used below:

Centre of Actuation (CoA) is the reference point defined by the positions and attitudes of the lifting rotors. CoA is typically equal to the geometric center of all the lifting rotors, yet mathematically the point where all lifting forces and moments are in equilibrium.

Centre of Gravity (CoG)=the point where all gravity forces act if the aircraft is in equilibrium. In other words: In physics, the CoG or centre of mass of a distribution of mass in space (sometimes referred to as the balance point) is the unique point where the weighted relative position of the distributed mass sums to zero. This point is defined by the aircraft layout, geometry and weight distribution.

Neutral Point (NP)=the point where, mathematically, all moments of any lifting surfaces (e.g., wings) acting upon the aircraft are zero. A mathematical analysis of the longitudinal static stability of a complete aircraft (including horizontal stabilizers) yields the position of centre of gravity at which stability is neutral. This position is called the neutral point. (The larger the area of any horizontal stabilizer, and the greater the moment arm of the horizontal stabilizer about the aerodynamic centre, the further aft is the neutral point.) A well-defined NP is key for a longitudinal stable aircraft and mainly defined by the static lifting units (e.g., wings, stabilizers).

Aerodynamic centre (CA)=the point where all pitching moment (Cm) coefficients of a lifting body (e.g., wing) do not vary with angle of attack $\alpha$ (dCm/d$\alpha$=0). This point is primarily defined by the static lifting units (e.g., wings, stabilizers) in terms of planform, position, size, etc. More specifically, the torques or moments acting on an airfoil moving through a fluid can be accounted for by the net lift and net drag applied at some point on the airfoil, and a separate net pitching moment about that point, whose magnitude varies with the choice of where the lift is chosen to be applied. The CA is the point at which the pitching moment coefficient for the airfoil does not vary with lift coefficient (i.e., angle of attack), making analysis simpler.

The present invention proposes to find a technical solution in order to bring the Center of Gravity, the Center of Actuation, and the Neutral Point as close as possible to each other during the flight phases of hovering over the transition towards airplane mode, and vice versa. Next to a low drag design and a structurally integrated airframe design, the aircraft's layout is preferably designed in such a manner that the longitudinal stability, which is defined by Cm/$\alpha$, is negative (i.e., Cm/$\alpha$<0).

As any aircraft moves, it will be subjected to minor changes in the forces that act on it, and in its speed. If such a change causes further changes that tend to restore the aircraft to its original speed and orientation, without human or machine input, the aircraft is said to be statically stable. Such aircraft has positive stability. On the other hand, if such a change causes further changes that tend to drive the aircraft away from its original speed and orientation, the aircraft is said to be statically unstable. Such aircraft has negative stability. As known to the skilled person, aircraft can have a form of low-negative stability called relaxed stability to provide extra-high maneuverability.

The invention may comprise to choose the lifting units' coordinate positions in such a way that they are arranged essentially symmetrical in terms of the aircraft's geometry thus defining a CoA which is geometrically, at least approximately, in the same x-position as the CoG while the NP is designed to be aft of these two points (CoA, CoG).

Typically, the principal axes of an aircraft are defined as

Longitudinal axis, or roll axis—an axis drawn through the body of the aircraft from tail to nose in the normal direction of flight, or the direction the pilot faces, similar to a ship's waterline.

Transverse axis, or lateral axis, or pitch axis—an axis running from the pilot's left to right in piloted aircraft, and parallel to the wings of a winged aircraft, parallel to the buttock line.

Normal axis, or yaw axis—a vertical axis drawn from top to bottom, and perpendicular to the other two axes.

Hereinafter, these axes are also represented by the letters x, y, and z, respectively.

The invention may also comprise a specific balancing of the aircraft's wing surface size (or area) between front wing and rear wing as this defines the longitudinal stability of the aircraft. The above-mentioned forward sweep of these wings pushes the aircraft's neutral point (NP) as far as possible to the aft.

In a corresponding embodiment of the aircraft according to the invention, a centre of actuation of the aircraft is geometrically in the same longitudinal position as the aircraft's centre of gravity, while a neutral point is located aft of both the centre of actuation and the centre of gravity.

In total, said front and rear wings have the necessary size (area) in order to create the lift needed to carry the weight of entire aircraft.

However, the front and rear wings may have an unequal planform size of 40% in the front and 60% in the rear, yet the produced lift can have the opposite ratio, with 60% for the front wing and 40% for the rear wing. In order to achieve this, the rear wing may be split into two separate, yet structurally connected parts, i.e., an aircraft lifting part (wing) and a stabilizing unit (e.g., in the form of a so-called V-Tail) which is not strongly contributing to the aircraft's lift, yet provides a significant horizontal surface acting as a wind vane contributing to the lateral stability.

In a corresponding embodiment of the aircraft according to the invention, the front wing has a wing area $S_{front}$ that is smaller than a wing area $S_{rear}$ of the rear wing, preferably 60%<$S_{front}/S_{rear}$<100%, more preferably 60%<$S_{front}/S_{rear}$<70%.

In another embodiment of the aircraft according to the invention, the rear wing extends sideways from the fuselage in a plane perpendicular to a longitudinal axis (x) of the aircraft, such that respective wing halves form an angle ($\theta$)<180°, preferably approximately 90° to 100°.

In order to reduce the download effect of any rotating lifting unit (e.g., propellers), which is created if an airflow generated by the lifting unit impinges a solid material (e.g., the engine mounts), wing attachments can be placed in between the rotor planes. Said rotor planes can be defined as respective areas swept by the rotating propellers. This leads to improved rotor performances during hovering or low speed manoeuvres.

Due to the presence of a front wing, the rear wing is typically negatively affected in terms of aerodynamics as the front wing induces an airflow impinging the rear wing. In order to reduce this effect, in a corresponding embodiment of the aircraft according to the invention the rear wing can be placed higher in vertical position. However, it can still be connected to the connecting beams. Generally speaking, this feature may lead to a rigid airframe design from body (fuselage) to wing and from wing to lifting unit.

Due to the fact that the front and rear wings are structurally connected via the connecting beams, any torsion occurring in the wing can be significantly reduced. This is beneficial as loads are balanced and routed.

As indicated above, the aircraft's lifting units can be placed essentially symmetrical about the aircraft longitudinal (x) and lateral (y) axis. In this way, coupling in the multicopter mode is minimized and performance during the OEI mode is improved, as the respective geometrical distances from every one of the lifting units to the centre of gravity are essentially the same.

In a corresponding embodiment of the aircraft according to the invention, the lifting units are thus placed symmetrically about a longitudinal and a lateral axis, respectively, of the aircraft.

As mentioned above, the positioning of the lifting units defines the centre of actuation (CoA) for the multicopter mode, which can be defined in terms of longitudinal position by $$x_{CoA} = \frac{1}{n}\sum_{i=1}^{n} x_i,$$

wherein $x_i$ denotes the longitudinal positions of the lifting units and wherein n=6, in case of a hexacopter configuration.

In a corresponding embodiment of the aircraft according to the invention, the aircraft comprises three lifting units on each one of the connecting beams.

This will also work for a quadcopter (n=4) or for an octocopter (n=8) or for any other coaxial configuration (with respect to the aircraft's longitudinal axis).

In order to reduce the download effect from any (rotating) lifting units, the static lift units (i.e., wings) can be efficiently connected to the structural or connecting beams at a (longitudinal) position that is located between each rotating lift unit's rotation disc or rotor plane (i.e., an area swept by the respective propellers).

In a corresponding embodiment of the aircraft according to the invention, attachments of the front wing and the rear wing, respectively, to the connecting beams are placed in between respective rotor planes swept by the propellers, so that there is no overlap in vertical direction between the propellers and said attachments.

The aircraft according to the invention has a front wing and a rear wing which together define the aircraft's neutral point (NP). As known to the skilled person, the NP is mainly defined by the combination of the respective aerodynamic centres (CA) of the aircraft wings. The distance of each aerodynamic centre ($CA_{front}$ for the front wing and $CA_{rear}$ for the rear wing) multiplied with the respective longitudinal distance x to the aircraft's centre of gravity (CoG) defines a longitudinal momentum. In the context of the present invention, with the presence of a front and a rear wing, two aerodynamic centres must be considered and balanced. As mentioned above, $Cm/\alpha$ can be chosen to be negative, hence leading to a stable aircraft.

More specifically, longitudinal static stability is achieved by distributing the horizontal surface areas of a aircraft in such a way that a pitch deviation induces a counteracting pitch moment. All horizontal surface area aft of the CoG contributes positively to the longitudinal static stability by the wind vane effect. All horizontal surface area in front of the CoG destabilizes. Each horizontal surface area contributes to this effect with its respective area multiplied with the lever arm from its center of area to the CoG. The Neutral Point (NP) of the aircraft is defined as the point where all pitching moments are in equilibrium. To achieve longitudinal static stability, said Neutral Point needs to be aft of CoG. This geometry leads to $Cm/\alpha<0$.

Accordingly, in another embodiment of the aircraft longitudinal aircraft stability, which is defined by a quantity $Cm/\alpha$, is negative, Cm being a pitching moment coefficient and a being an angle of attack.

Typical state of the art aircraft wings may be connected to the fuselage in an essentially lateral angle (90°), leading to a straight wing (no sweep). Following this principle will lead to a resulting neutral point which is positioned relatively far forward, hence creating an unstable longitudinal stability. In order to shift the aerodynamic centre of each wing aftwards (toward the rear), the front wing incorporates a sweep angle γ, being less than 90°, and the rear wing incorporates a sweep angle of β, also being less than 90°. As mentioned, the front wing has a wing area $S_{front}$ that is smaller than a wing area $S_{rear}$ of the rear wing, whereas the rear wing surfaces may produce less vertical lift due to the presence of a V-Tail.

In order to further reduce the length of the fuselage while keeping a sufficient rear surface wing area $S_{rear}$, the V-Tail may incorporate a sweep angle δ greater than 90°. This also leads to an improved load transfer into the fuselage body.

In a corresponding embodiment of the aircraft according to the invention, the rear wing is partly shaped in the form of a V-Tail with a sweep angle (δ) greater than 90°.

Furthermore, the front wing may incorporate a dihedral angle (λ) which, combined with the above-mentioned sweep angle (γ), positively affects the aircraft's lateral/directional stability.

In a corresponding embodiment of the aircraft according to the invention, the front wing incorporates a dihedral angle (λ), preferably at least at or increasing toward respective tips thereof, preferably $0°<\lambda<5°$.

The rear wing may incorporate an anhedral angle (ε) in order to create a high vertical offset in the region of higher downwash of the front wing which occurs primarily in an in-board portion of the wing (spanwise).

In a corresponding embodiment of the aircraft according to the invention, the rear wing therefore incorporates an anhedral angle (ε), at least in and preferably increasing toward an outer portion thereof, i.e., towards said connecting beams, preferably $0°<\varepsilon<5°$.

In aeronautics, "dihedral" is the angle between the left and right wings (or tail surfaces) of an aircraft. Particularly, a dihedral angle is the upward angle from horizontal of the wings or tailplane of a (fixed-wing) aircraft. "Anhedral angle" is the name given to a negative dihedral angle, that is, when there is a downward angle from horizontal of the wings or tailplane of a (fixed-wing) aircraft.

In a corresponding embodiment of the aircraft according to the invention, said aircraft further comprises at least one forward propulsion unit, said forward propulsion unit preferably—and without limitation—having at least one propeller and at least one motor driving said propeller, preferably an electric motor, more preferably located toward the rear of the aircraft. Such forward propulsion unit is beneficial in forward flight.

In a preferred embodiment of the aircraft according to the invention, at least one forward propulsion unit is located on each side of the fuselage, preferably below both the front wing and the rear wing and most preferably forward of the rear wing. This has proved highly beneficial for reaching high forward flight velocities.

In yet a further advantageous embodiment of the aircraft according to the invention, the front wing and the rear wing, when viewed along a longitudinal axis of the aircraft, together form a closed loop shape. This provides increased mechanical stability and reduces negative aerodynamic effects.

BRIEF DESCRIPTION OF THE DRAWINGS

Further characteristics and advantages of the present invention can be gathered from the following description of exemplary embodiments with reference to the appended drawings.

DETAILED DESCRIPTION

Figure 1:
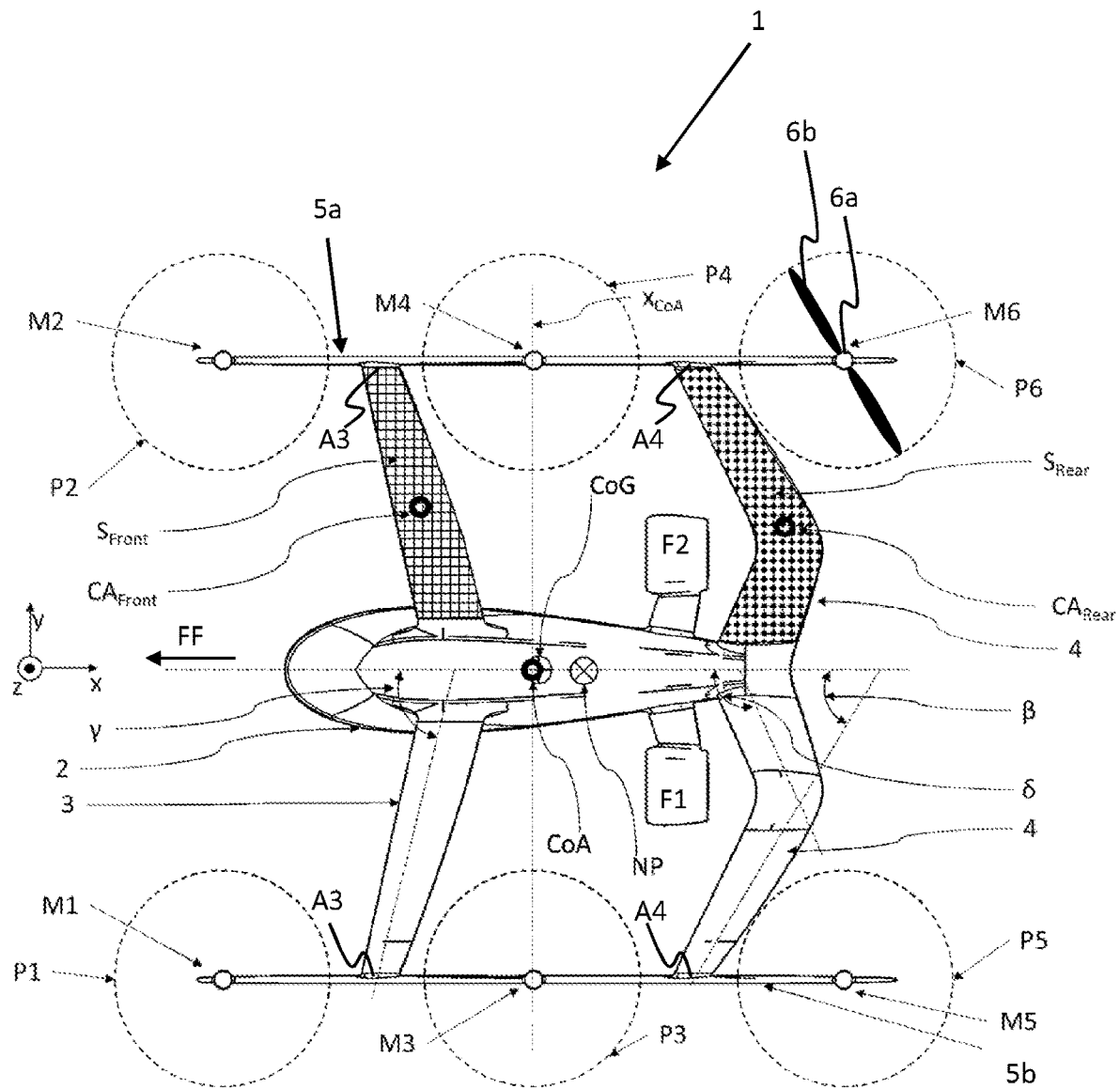
FIG. 1 shows a plan view of an aircraft according to the invention.

FIG. 1 shows a VTOL aircraft 1 having a fuselage or fuselage body 2 for transporting passengers and/or load. x, y, and z denote the aircraft axes (longitudinal, transverse, and vertical, respectively, as detailed above). A front wing 3 is attached to the fuselage 2. Furthermore, a rear wing 4 is attached to the fuselage 2 behind the front wing 3 in a direction of forward flight (arrow FF) of the aircraft 1. A right connecting beam 5a and a left connecting beam 5b structurally connect the front wing 3 and the rear wing 4, which connecting beams 5a, 5b are laterally spaced apart from the fuselage 2. The aircraft 1 comprises six lifting units M1-M6, three of which are arranged on each one of the connecting beams 5a, 5b. The lifting units M1-M6 each comprise at least one propeller 6b and at least one motor 6a driving said propeller 6b, preferably an electric motor, and they are arranged with their respective propeller axis in an essentially vertical orientation (z axis). This is explicitly shown for only one (M6) of the lifting units M1-M6 in FIG. 1.

The lifting units M1-M6 are placed symmetrically about the longitudinal (x) and lateral (y) axes of the aircraft 1: Lifting units M1 and M5 are placed at equal distances (in x-direction) toward the front and the rear, respectively, when compared to lifting unit M3. The same holds for lifting units M2, M4, and M6. Furthermore, the three lifting units on each side of the aircraft 1 are placed at equal transverse distances (in y-direction) from the aircraft's longitudinal axis.

Reference numerals P1-P6 denote rotor planes that can be defined as respective areas swept by the rotating propellers 6b of lifting units M1-M6. Wing attachments to the connecting beams 5a, 5b are be placed in between and outside the rotor planes P1-P6. Said wing attachments are denoted A3 for front wing 3 and A4 for rear wing 4.

The front wing 3 and the rear wing 4, at least in portions thereof, i.e., the outer portion of the rear wing 4 with respect to the fuselage 2, both define a sweep angle ($\gamma$, $\beta$) which is less than 90° (forward sweep). Rear wing 4 has a backward sweep (angle $\delta$) in a region close to the fuselage 2 (V-Tail), which helps to reduce the length of the fuselage 2 while keeping a sufficient rear surface wing area $S_{rear}$ (cf. below). Preferred values for these angles are: 45°<$\gamma$<135°, preferably $\gamma$=75°, 30°<$\beta$<90°, preferably $\beta$=65°, and 70°<$\delta$<170°, preferably $\delta$=110°.

Reference numerals F1 and F2 denote forward propulsion units (pushers) that are attached at the right side and at the left side of the fuselage 2, respectively, toward the rear of the aircraft 1 (in front of rear wing 4). The pushers can comprise at least one propeller and at least one motor driving said propeller (not shown).

The specific physical points of the aircraft 1, which were defined earlier, are denoted as CoG (centre of gravity), CoA (centre of actuation), CA (aerodynamic centre) and NP (neutral point). Also denoted are the individual aerodynamic centres of both the front wing 3 ($CA_{Front}$) and the rear wing 4 ($CA_{Rear}$), respectively, for that part of each wing which extends between fuselage 2 and right connecting beam 5a. The same applies to that part of each wing which extends between fuselage 2 and left connecting beam 5b (not shown in FIG. 1). As can be gathered from FIG. 1, the centre of actuation CoA of the aircraft 1 is geometrically in the same longitudinal position ($x_{CoA}$) as the aircraft's centre of gravity CoG (at least approximately), while the neutral point NP is located well aft of both the centre of actuation CoA and the centre of gravity CoG due to the forward sweep of wings 3 and 4.

The front wing 3 has a wing area $S_{front}$ that is smaller than a wing area $S_{rear}$ of the rear wing 4. In the present example 60%<$S_{front}/S_{rear}$<70%. In sum, the rear wing 4 comprises the surface of a V-Tail (wing half 4b) and a classical lifting wing surface (wing half 4a), which will become apparent from FIGS. 3 to 5 below.

Figure 2:
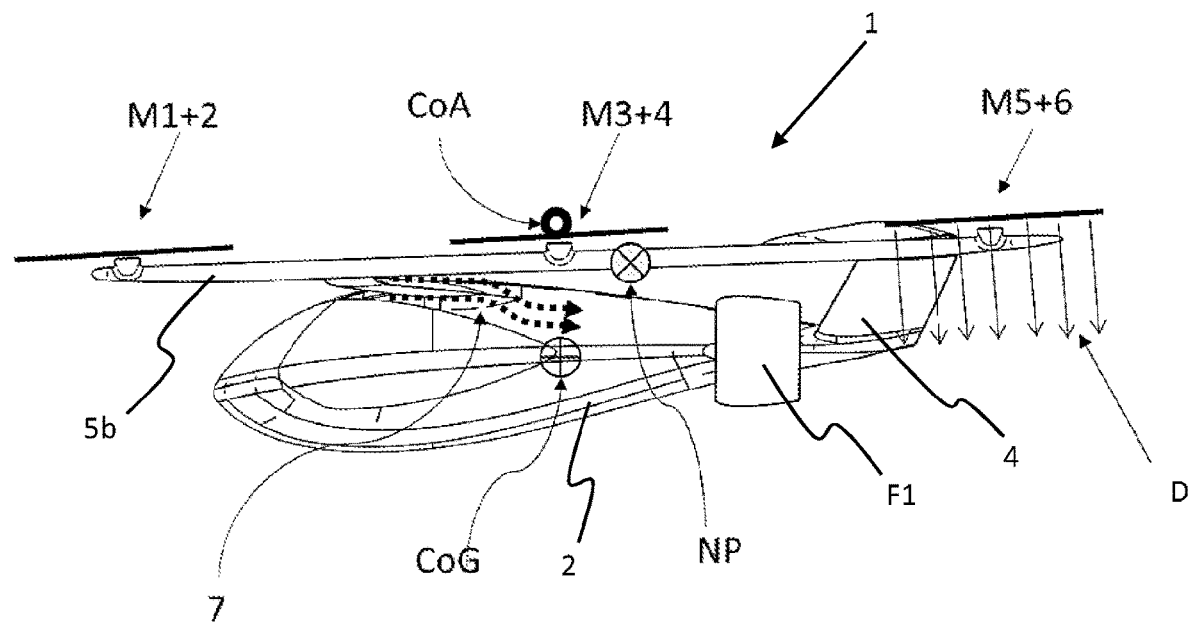
FIG. 2 shows a side view of an aircraft according to the invention.

FIG. 2 shows a side view of the aircraft 1 of FIG. 1. Same elements are denoted by common reference numerals in all Figures.

The connecting beams (only beam 5b is visible in FIG. 2) are placed higher than (or above) the fuselage 2, i.e., in the z direction (cf. FIG. 1).

M1+2 denotes lifting units M1 and M2, which are located behind one another in the line of sight. Same applies to lifting units M3 and M4 as well as lifting units M5 and M6, respectively.

Reference numeral D denotes propeller downwash (only shown for one (M5+6) of the lifting units M1-M6). Said wing attachments (cf. FIG. 1) are located outside the downwash zones.

Figure 3:
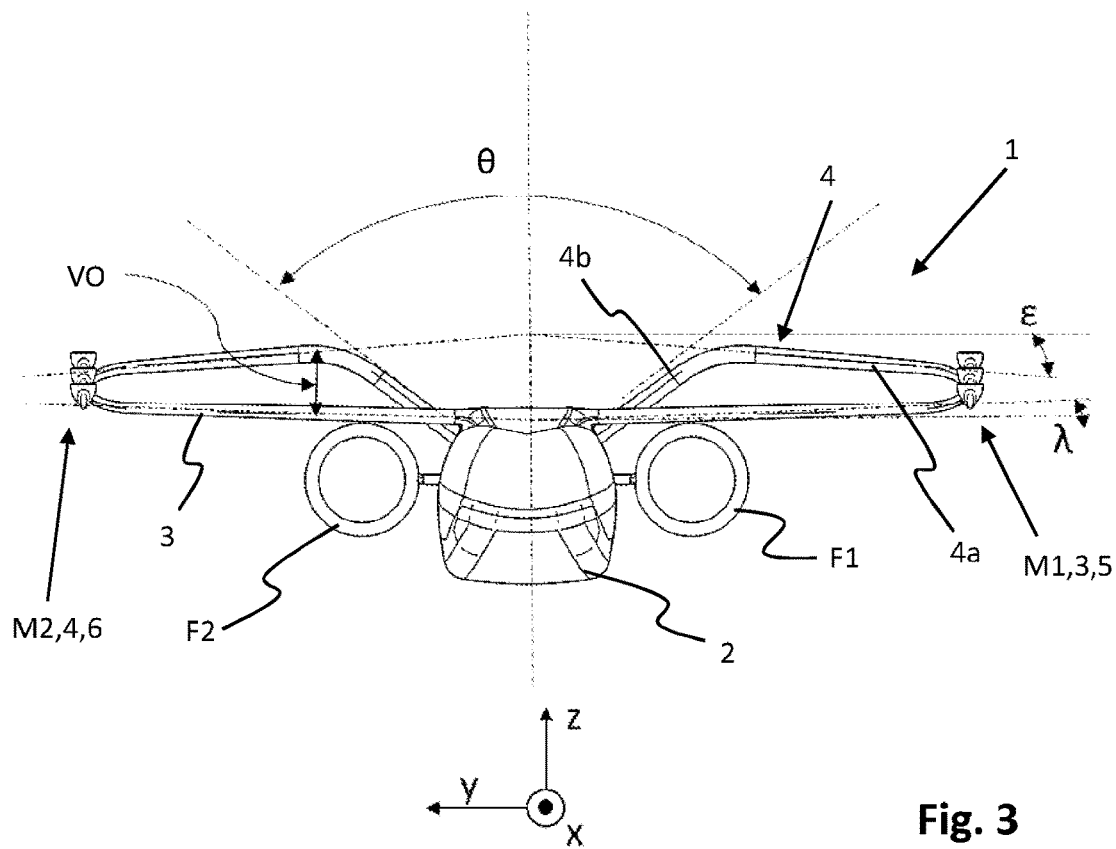
FIG. 3 shows a front view of an aircraft according to the invention.

FIG. 3 shows a front view of the aircraft 1. As can be seen, in a plane perpendicular to a longitudinal axis (x) of the aircraft 1, the rear wing 4 extends sideways from the fuselage 2 such that respective wing halves 4 a, 4 b of rear wing 4 form an angle $\theta$<180°, preferably approximately 90° to 100°. The inner wing half 4 b forms the surface of a V-Tail, while the outer half 4 a represents a classical lifting wing surface.

Front wing 3 incorporates a dihedral angle ($\lambda$), which, combined with the above-mentioned sweep angle ($\gamma$<90°), positively affects lateral/directional stability of the aircraft 1. Said angle $\lambda$ may increase toward respective tips of the wing 3. Additionally, the rear wing 4 incorporates an anhedral angle (ε) in order to create a high vertical offset VO in the region of higher downwash 7 (cf. FIG. 2) of the front wing 3 which occurs especially in the in-board portion of said wing 3 (spanwise). Said angle ε, too, may increase toward respective tips of the wing 4. In this way, the front wing 3 and the rear wing 4, when viewed along the longitudinal axis (x) of the aircraft 1, together form a closed loop shape.

Figure 4:
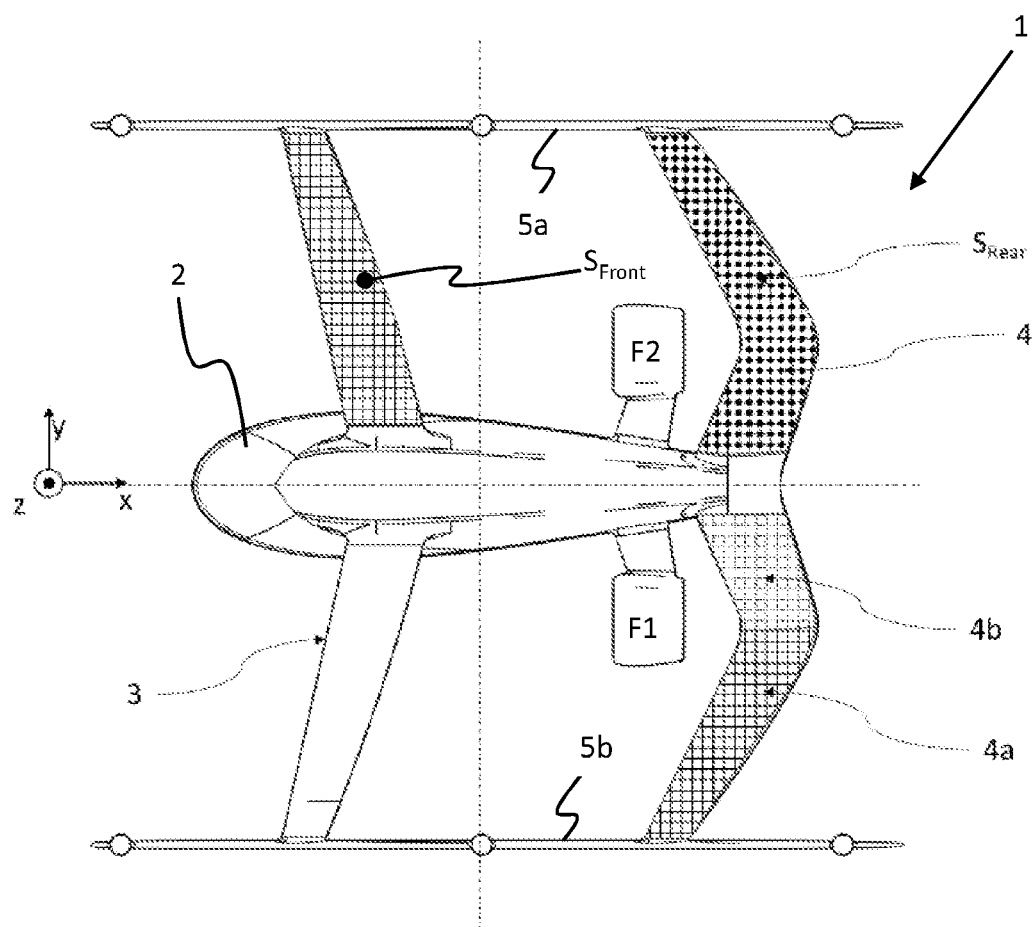
FIG. 4 shows a simplified version of FIG. 1.

FIG. 4 is a somewhat simplified version of FIG. 1 for to illustrate the front wing 3 with its area $S_{front}$ being smaller than area $S_{rear}$ of the rear wing 4. However, the rear wing surfaces produce less vertical lift due to the V-Tail configuration. Rear wing 4 comprises the surface of the V-Tail 4b and classical lifting wing surface 4a, which are illustrated by means of different shadings.

Figure 5:
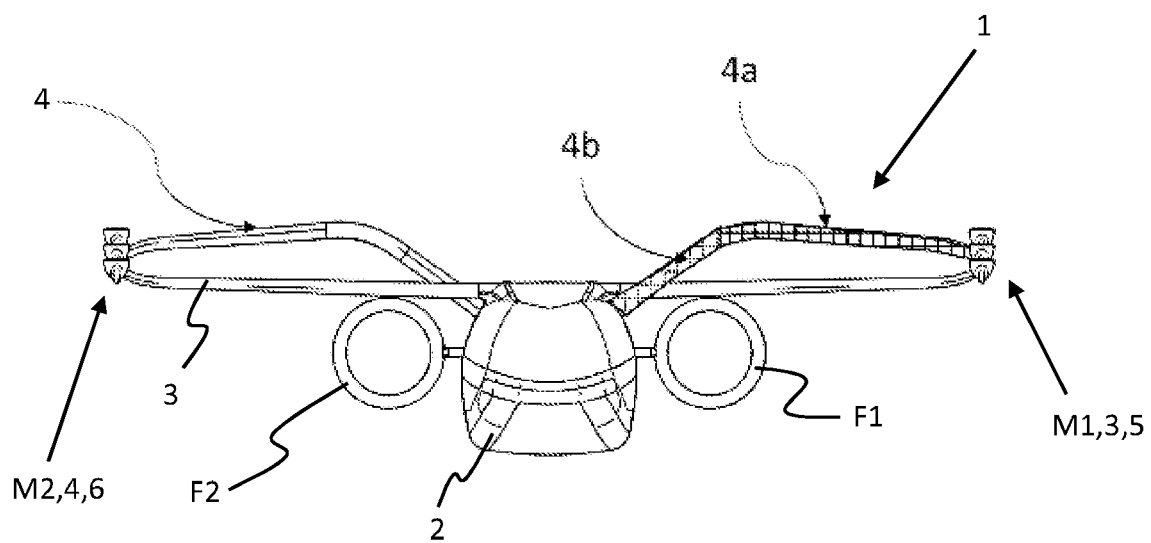
FIG. 5 shows another front view of an aircraft according to the invention.

This is further illustrated in FIG. 5, which is another front view of the aircraft 1 (cf. FIG. 3 for additional details).

Figure 6:
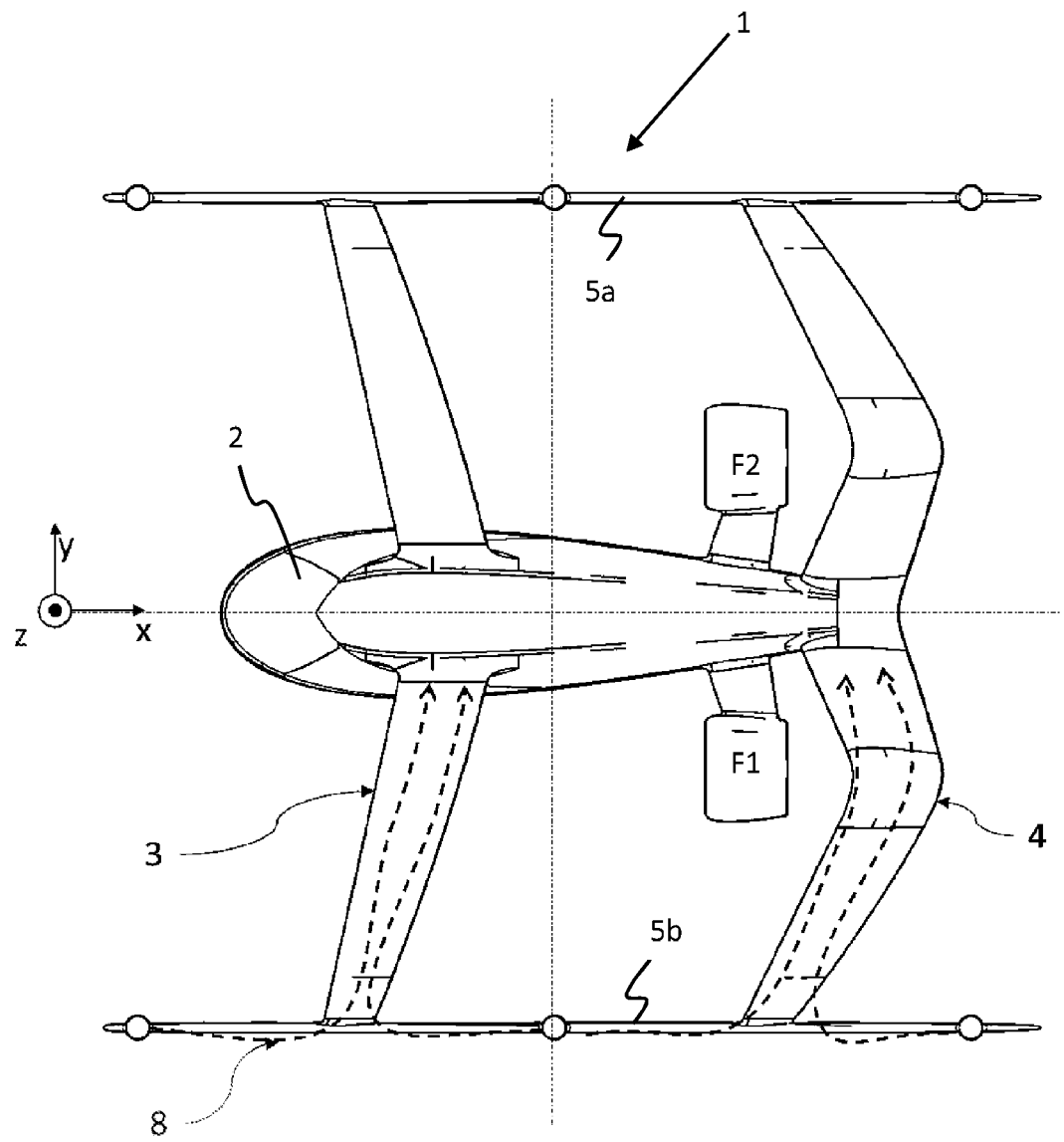
FIG. 6 shows another plan view of an aircraft according to the invention.

Finally, as illustrated in FIG. 6, the V-Tail sweep angle δ, δ>90°, also leads to an improved load transfer (dashed lines denoted by reference numeral 8) as the "V" configuration transfers loads from the connecting beam 5b via wing 4a and via the V-tail 4b into the fuselage 2.

The invention claimed is:

1. A VTOL aircraft (1), comprising:
   a fuselage (2) for transporting at least one of passengers or load;
   a front wing (3) attached to the fuselage (2);
   a rear wing (4) attached to the fuselage (2), behind the front wing (3) and an aerodynamic center in a direction of forward flight (FF);
   a right connecting beam (5a) and a left connecting beam (5b), said connecting beams (5a, 5b) structurally connect the front wing (3) and the rear wing (4), said connecting beams (5a, 5b) are spaced apart from the fuselage (2); and
   at least two lifting units (M1-M6) on each one of the connecting beams (5a, 5b), said lifting units (M1-M6) each comprise at least one propeller (6b) and at least one motor (6a) driving said propeller (6b), and are arranged with the respective propeller axis in an essentially vertical orientation (z);
   wherein the front wing (3), at least in portions thereof, has a sweep angle γ between γ=45° and γ=135°, the rear wing (4) includes an outer rear wing section (4a) on each side of the fuselage (2) that as a whole has a forward sweep with sweep angle 30°≤β≤90°, and the rear wing (4) includes an inner rear wing section (4b) on each side of the fuselage that has a rearward sweep from the fuselage to the forward sweep portion of the outer rear wing section, the inner rear wing section forms a lateral stabilizing unit of the aircraft; and
   wherein in a plane perpendicular to a longitudinal axis (x) of the aircraft (1), the rear wing (4) extends sideways from the fuselage (2) such that respective inner rear wing halves (4b) of the rear wing form an angle 90°≤θ≤100°, producing lateral stabilization of the aircraft.

2. The aircraft (1) of claim 1, wherein the front wing (3) has a wing area ($S_{front}$) that is smaller than a wing area ($S_{rear}$) of the rear wing (4).

3. The aircraft (1) of claim 2, wherein 60%<$S_{front}$/$S_{rear}$<100%.

4. The aircraft (1) of claim 1, wherein the rear wing (4) is partly shaped as a V-Tail with a sweep angle (δ) greater than 90°.

5. The aircraft (1) of claim 1, wherein the at least two lifting units (M1-M6) on each one of the connecting beams comprises three of the lifting units (M1-M6) on each one of the connecting beams (5a, 5b).

6. The aircraft (1) of claim 1, wherein the lifting units (M1-M6) are placed symmetrically about a longitudinal (x-z) and a lateral (y-z) plane, respectively, of the aircraft (1).

7. The aircraft (1) of claim 1, wherein attachments (A3, A4) of the front wing (3) and the rear wing (4), respectively, to the connecting beams (5a, 5b) are placed in between respective rotor planes (P1-P6) swept by the propellers (6b).

8. The aircraft (1) of claim 1, wherein the rear wing (4) is placed higher in vertical position (z) than the front wing (3).

9. The aircraft (1) of claim 1, wherein the front wing (3) incorporates a dihedral angle (λ).

10. The aircraft (1) of claim 9, wherein the dihedral angle (λ) is incorporated at respective tips of the front wing (3).

11. The aircraft (1) of claim 1, wherein the outer rear wing section (4a) incorporates an anhedral angle (ε) towards said connecting beams (5a, 5b).

12. The aircraft (1) of claim 1, wherein longitudinal aircraft stability, which is defined by a quantity Cm/α, is negative, Cm being a pitching moment coefficient and α being an angle of attack.

13. The aircraft (1) of claim 1, wherein a centre of actuation (CoA) is geometrically in a same longitudinal position ($x_{CoA}$) as a centre of gravity (CoG) of the aircraft, and a neutral point (NP) is located aft of both the centre of actuation (CoA) and the centre of gravity (CoG).

14. The aircraft (1) of claim 1, further comprising at least one forward propulsion unit (F1, F2) connected thereto.

15. The aircraft (1) of claim 14, wherein the at least one forward propulsion unit includes at least one propeller and at least one motor driving said propeller.

16. The aircraft (1) of claim 15, wherein the at least one motor is an electric motor.

17. The aircraft (1) of claim 14, wherein the at least one forward propulsion unit (F1, F2) includes one of the forward propulsion units located on each side of the fuselage (2).

18. The aircraft (1) of claim 17, wherein the forward propulsion units are located below both the front wing (3) and the rear wing (4) and forward of the rear wing (4).

19. The aircraft (1) of claim 1, wherein the front wing (3) and the rear wing (4), when viewed along a longitudinal axis (x) of the aircraft (1), together form a closed loop shape.

* * * * *